US012322099B2

(12) United States Patent
Nakano et al.

(10) Patent No.: US 12,322,099 B2
(45) Date of Patent: Jun. 3, 2025

(54) IMAGE PROCESSING APPARATUS, IMAGE PROCESSING METHOD, AND NON-TRANSITORY COMPUTER-READABLE MEDIUM

(71) Applicant: NEC Corporation, Minato-ku, Tokyo (JP)

(72) Inventors: Gaku Nakano, Tokyo (JP); Shoji Nishimura, Tokyo (JP); Yoshitaka Higeta, Tokyo (JP); Youtarou Noda, Tokyo (JP); Shigeki Shinoda, Tokyo (JP); Yuzo Senda, Tokyo (JP); Shin Tominaga, Tokyo (JP); Masumi Ishikawa, Tokyo (JP); Daisuke Iketuji, Tokyo (JP); Kana Takizawa, Tokyo (JP); Kenichi Ishii, Tokyo (JP); Yoshiyuki Satou, Tokyo (JP); Eishi Arita, Tokyo (JP); Shota Yamamoto, Tokyo (JP); Shinya Yamasaki, Tokyo (JP); Narumitsu Notomi, Tokyo (JP); Aki Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 214 days.

(21) Appl. No.: 18/007,799

(22) PCT Filed: Apr. 22, 2021

(86) PCT No.: PCT/JP2021/016301
§ 371 (c)(1),
(2) Date: Dec. 2, 2022

(87) PCT Pub. No.: WO2021/246078
PCT Pub. Date: Dec. 9, 2021

(65) Prior Publication Data
US 2023/0298166 A1    Sep. 21, 2023

(30) Foreign Application Priority Data

Jun. 5, 2020 (JP) .................................. 2020-098401

(51) Int. Cl.
*G06T 7/70* (2017.01)
*G06T 7/00* (2017.01)
(Continued)

(52) U.S. Cl.
CPC .............. *G06T 7/0012* (2013.01); *G06T 7/20* (2013.01); *G06T 7/60* (2013.01); *G06T 7/70* (2017.01);
(Continued)

(58) Field of Classification Search
CPC ........... G06T 7/0012; G06T 7/20; G06T 7/60; G06T 7/70; G06T 2207/30201;
(Continued)

(56) References Cited

U.S. PATENT DOCUMENTS

2021/0358632 A1* 11/2021 Fazio .................. G06F 16/5854
2021/0375117 A1* 12/2021 Updike ................ G08B 21/182

FOREIGN PATENT DOCUMENTS

JP    2019-106631 A    6/2019
JP    2019-160015 A    9/2019
(Continued)

OTHER PUBLICATIONS

International Search Report for PCT Application No. PCT/JP2021/016301, mailed on Jul. 6, 2021.

*Primary Examiner* — Siamak Harandi
(74) *Attorney, Agent, or Firm* — Sughrue Mion, PLLC

(57) ABSTRACT

An image processing apparatus (10) includes an image processing unit (110) and a risk information generation unit (120). The image processing unit (110) acquires and processes an image generated by an image capture apparatus (Continued)

(20), that is, an image including a plurality of persons. As an example, the image processing unit (110) sets a person being at least part of the plurality of persons as a reference person and computes a distance (first distance) between the reference person and the closest person to the reference person. By using the first distance, the risk information generation unit (120) generates infection risk information in a target region being an image capture target of the image capture apparatus (20).

17 Claims, 18 Drawing Sheets

(51) Int. Cl.
*G06T 7/20* (2017.01)
*G06T 7/60* (2017.01)
*G06V 40/16* (2022.01)

(52) U.S. Cl.
CPC .... *G06V 40/16* (2022.01); *G06T 2207/30201* (2013.01)

(58) Field of Classification Search
CPC ........ G06V 40/16; G06V 20/52; G08B 21/02; G08B 21/24; G08B 25/00; G08B 25/04
See application file for complete search history.

(56) References Cited

FOREIGN PATENT DOCUMENTS

| | | |
|---|---|---|
| JP | 2019-200715 A | 11/2019 |
| WO | 2020/044826 A1 | 3/2020 |

\* cited by examiner

FIG. 3

| IMAGE CAPTURE APPARATUS ID | | | ... | 150 |
|---|---|---|---|---|
| DATE AND TIME (FRAME NUMBER) | IMAGE DATA | ANALYSIS RESULT (INFECTION RISK INFORMATION) | | |
| ... | ... | ... | | |
| ... | ... | ... | | |
| ... | ... | ... | | |
| ... | ... | ... | | |

IMAGE PROCESSING APPARATUS, IMAGE PROCESSING METHOD, AND NON-TRANSITORY COMPUTER-READABLE MEDIUM

This application is a National Stage Entry of PCT/JP2021/016301 filed on Apr. 22, 2021, which claims priority from Japanese Patent Application 2020-098401 filed on Jun. 5, 2020, the contents of all of which are incorporated herein by reference, in their entirety.

TECHNICAL FIELD

The present invention relates to an image processing apparatus, an image processing method, and a program

BACKGROUND ART

Image processing has been used for various purposes in recent years. For example, Patent Document 1 describes, in a system for keeping a reaching range of droplets from a first target person out of a breathing region of a second target person by adjusting an environment in a space, determining positions and orientations of the faces of the first target person and the second target person by image processing.

RELATED DOCUMENT

Patent Document

Patent Document 1: International Application Publication No. WO 2020/044826

SUMMARY OF THE INVENTION

Technical Problem

In order to reduce a risk of contracting an infectious disease, it is important to avoid a location where contraction of an infectious disease may occur. However, it is difficult to understand likelihood of contracting an infectious disease at such location. An object of the present invention is to facilitate understanding likelihood of contracting an infectious disease at a target location.

Solution to Problem

The present invention provides an image processing apparatus including:
  an image processing unit that, by processing an image including a plurality of persons, computes, for a person being at least part of the plurality of persons, a first distance being a distance to the closest person to the person; and
  a risk information generation unit that, by using the first distance, generates infection risk information being information about a risk of contracting an infectious disease or a safety factor of not contracting an infectious disease in a target region being a region included in the image.

The present invention provides an image processing method including, by a computer:
  performing image processing of, by processing an image including a plurality of persons, computing, for a person being at least part of the plurality of persons, a first distance being a distance to the closest person to the person; and
  performing risk information generation processing of, by using the first distance, generating infection risk information being information about a risk of contracting an infectious disease or a safety factor of not contracting an infectious disease in a target region being a region included in the image.

The present invention provides a program causing a computer to perform:
  an image processing function of, by processing an image including a plurality of persons, computing, for a person being at least part of the plurality of persons, a first distance being a distance to the closest person to the person; and
  a risk information generation function of, by using the first distance, generating infection risk information being information about a risk of contracting an infectious disease or a safety factor of not contracting an infectious disease in a target region being a region included in the image.

Advantageous Effects of Invention

The present invention facilitates understanding likelihood of contracting an infectious disease at a target location.

BRIEF DESCRIPTION OF THE DRAWINGS

FIG. 3 is a diagram illustrating an example of information stored by a storage unit.

DESCRIPTION OF EMBODIMENTS

Example embodiments of the present invention will be described below by using drawings. Note that, in every drawing, similar components are given similar signs, and description thereof is omitted as appropriate.

Figure 1:
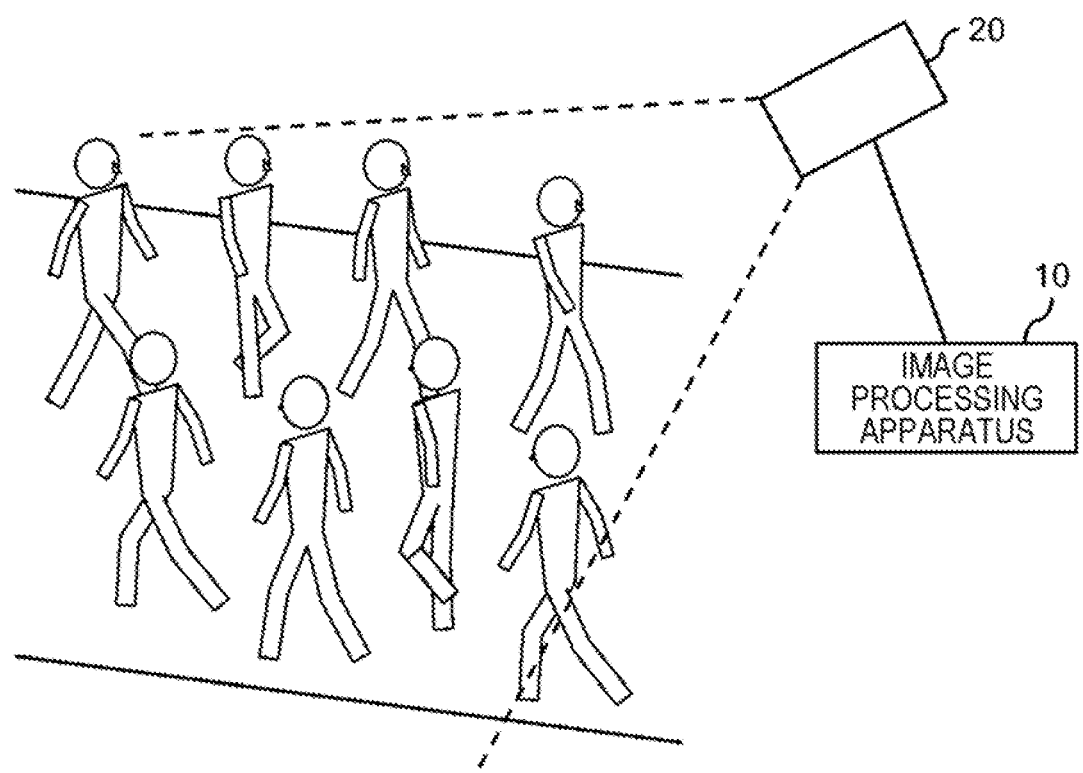
FIG. 1 is a diagram for illustrating a usage environment of an image processing apparatus according to an example embodiment.

FIG. 1 is a diagram for illustrating a usage environment of an image processing apparatus 10 according to an example embodiment. The image processing apparatus 10 is used with an image capture apparatus 20.

For example, the image capture apparatus 20 is a fixed camera and repeatedly captures images of a region where a plurality of persons such as a large number of unspecified persons come and go (hereinafter described as a target region). Therefore, an image generated by the image capture apparatus 20 includes a plurality of persons. While an image generated by the image capture apparatus 20 may have any frame rate, the frame rate may be, for example, a frame rate for constituting a dynamic image. Then, the image capture apparatus 20 transmits the generated image to the image processing apparatus 10.

By processing an image generated by the image capture apparatus 20, the image processing apparatus 10 computes the space between persons in the target region, that is, the distance between a certain person (hereinafter described as a reference person) and the closest person to the person (hereinafter described as a first distance). Then, by using the first distance, the image processing apparatus 10 generates information about a risk of contracting an infectious disease or a safety factor of not contracting an infectious disease in the target region (hereinafter described as infection risk information).

In the example illustrated in FIG. 1, the image processing apparatus 10 is connected to one image capture apparatus 20. However, the image processing apparatus 10 may be connected to a plurality of image capture apparatuses 20. In this case, the plurality of image capture apparatuses 20 capture images of target regions different from each other, respectively. Further, each of the plurality of image capture apparatuses 20 externally transmits an image in association with information for identifying the image capture apparatus 20 (hereinafter described as image capture apparatus-identification information). Thus, infection risk information can be readily generated for each of a plurality of (for example, as many as 100 or more) target regions.

Figure 2:
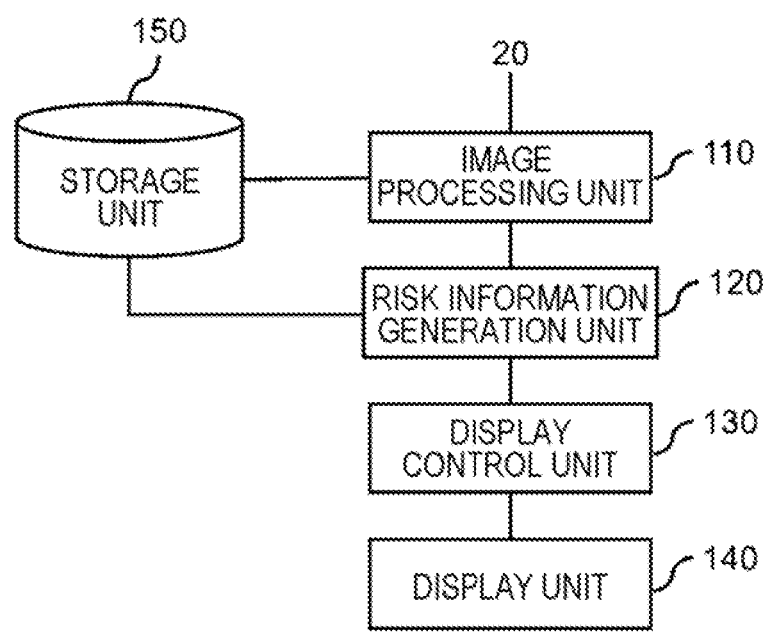
FIG. 2 is a diagram illustrating an example of a functional configuration of the image processing apparatus.

FIG. 2 is a diagram illustrating an example of a functional configuration of the image processing apparatus 10. The image processing apparatus 10 illustrated in this diagram includes an image processing unit 110 and a risk information generation unit 120.

The image processing unit 110 acquires and processes an image generated by the image capture apparatus 20, that is, an image including a plurality of persons. As an example, the image processing unit 110 computes the aforementioned first distance, with at least a person being part of a plurality of persons as the aforementioned reference person. A specific example of the method for computing a first distance will be described later.

Furthermore, the image processing unit 110 performs another type of processing on the image as needed and generates various types of information.

Note that, when the image processing apparatus 10 is connected to a plurality of image capture apparatuses 20, the image processing unit 110 acquires an image in association with image capture apparatus-identification information of an image capture apparatus 20 generating the image.

The risk information generation unit 120 generates infection risk information relating to a target region being a subject of image-capturing by the image capture apparatus 20 by using a first distance. As an example, the risk information generation unit 120 decides whether or not the first distance has a reference value or less and generates infection risk information by using the decision result. The reference value is set based on a so-called social distance. The social distance is a physical distance that should be kept between adjoining persons in order to prevent infection of an infectious disease. Then, the magnitude of the reference value is set based on a main infection route of a target infectious disease. For example, for an infectious disease mainly caused by droplet infection, a value equal to or greater than 1.5 m and equal to or less than 6 m is used as the reference value. Further, for an infectious disease mainly caused by contact infection, a value equal to or greater than 50 cm and equal to or less than 1.5 m is used as the reference value.

Note that, for example, infection risk information indicates a risk of contracting an infectious disease or a safety factor of not contracting an infectious disease in a target region. In this case, examples of a method for generating infection risk information from the aforementioned decision result include the following methods.

(Method 1) The risk information generation unit 120 computes the number of combinations of persons the first distance between whom has a reference value or less for each image and increases a risk indicated by infection risk information as the number increases. Use of this method enables the risk information generation unit 120 to generate infection risk information for each image.

(Method 2) The risk information generation unit 120 computes the per-unit-time number of appearances of a combination of persons the first distance between whom has the reference value or less and increases a risk indicated by infection risk information as the number of appearances increases. In this method, the risk information generation unit 120 uses processing results of a plurality of images generated at different timings.

(Method 3) In the method 2, the risk information generation unit 120 uses the per-unit-time and per-unit-area number of appearances.

Note that, in each of the aforementioned methods, when processing a plurality of temporally continuous images, the image processing unit 110 can compute the duration of a state in which the first distance has the reference value or less. The risk information generation unit 120 may increase a risk indicated by infection risk information as the length of the duration increases.

Note that there is a method of generating infection risk information without using the first distance. For example, the risk information generation unit 120 may compute the per-unit-area density of persons in a target region and increase a risk indicated by infection risk information as the density increases.

Further, the risk information generation unit 120 may use the fact by itself that the first distance has the reference value or less as infection risk information.

Further, the image processing unit 110 causes a storage unit 150 to store an image generated by the image capture apparatus 20. The image processing unit 110 may cause the storage unit 150 to store information generated by processing the image in association with the image. Note that the storage unit 150 is part of the image processing apparatus 10 in the example illustrated in this diagram. However, the storage unit 150 may be an apparatus external to the image processing apparatus 10.

The image processing unit 110 may generate the aforementioned information by processing an image stored in the storage unit 150. In this case, after being temporarily stored in the storage unit 150, an image generated by the image capture apparatus 20 can be read from the storage unit 150 at a desired timing and be processed. Note that the image processing unit 110 can acquire an image generated by the image capture apparatus 20 from the image capture apparatus 20 and process the image in real time regardless of existence of the storage unit 150.

The image processing apparatus 10 illustrated in FIG. 2 further includes a display control unit 130. The display control unit 130 superimposes, on an image to be processed, a display for causing recognition of a combination of persons the first distance between whom has the reference value or less, that is, a combination of a reference person and the closest person to the reference person and then causes a display unit 140 to display the display and the image. The display unit 140 includes a display. While the display unit 140 is part of the image processing apparatus 10 in the example illustrated in this diagram, the unit may be external to the image processing apparatus 10.

FIG. 3 is a diagram illustrating an example of information stored by the storage unit 150. In the example illustrated in this diagram, the storage unit 150 stores an image generated by the image capture apparatus 20 (described as image data in FIG. 3) in association with information for determining a date and time when the image is generated (such as a date and time itself or a frame number). Further, the storage unit 150 stores an image generated by the image capture apparatus 20 with information acquired by processing the image (described as an analysis result in FIG. 3). Note that the analysis result may include infection risk information.

Figure 4:
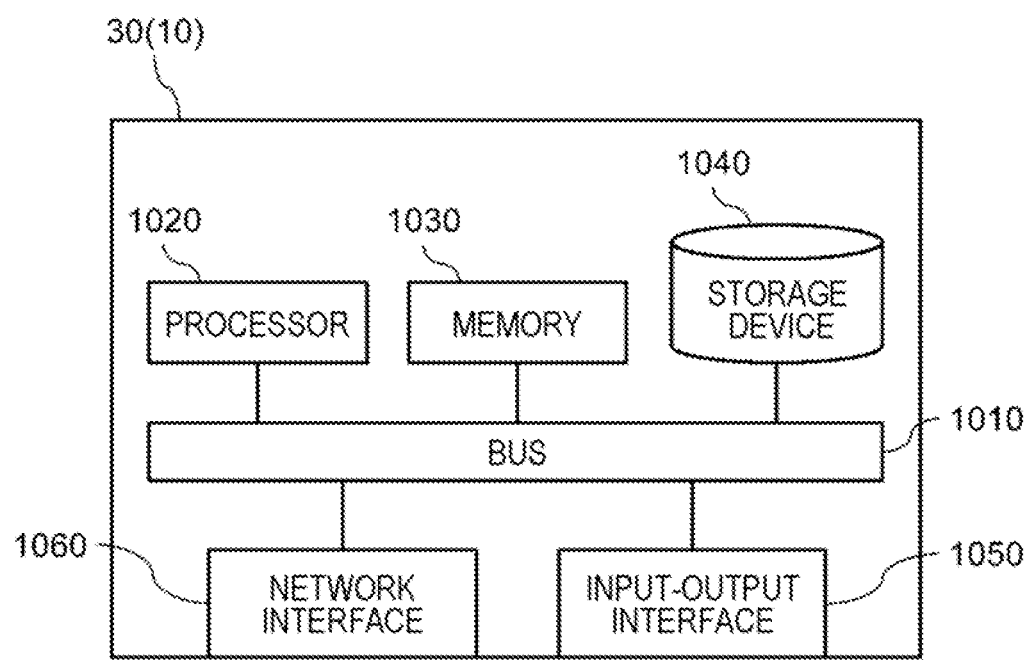
FIG. 4 is a diagram illustrating a hardware configuration example of the image processing apparatus.

FIG. 4 is a diagram illustrating a hardware configuration example of the image processing apparatus 10. The image processing apparatus 10 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from one another. Note that the method for interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules providing the functions of the information processing apparatus 100 (such as the image processing unit 110, the risk information generation unit 120, and the display control unit 130). By reading each program module into the memory 1030 and executing the program module by the processor 1020, each function related to the program module is provided. Further, the storage device 1040 also functions as the storage unit 150.

The input-output interface 1050 is an interface for connecting the image processing apparatus 10 to various types of input-output equipment.

The network interface 1060 is an interface for connecting the image processing apparatus 10 to a network. Examples of the network include a local area network (LAN) and a wide area network (WAN). The method for connecting the network interface 1060 to the network may be a wireless connection or a wired connection. The image processing apparatus 10 may communicate with the image capture apparatus 20 through the network interface 1060.

Figure 5:
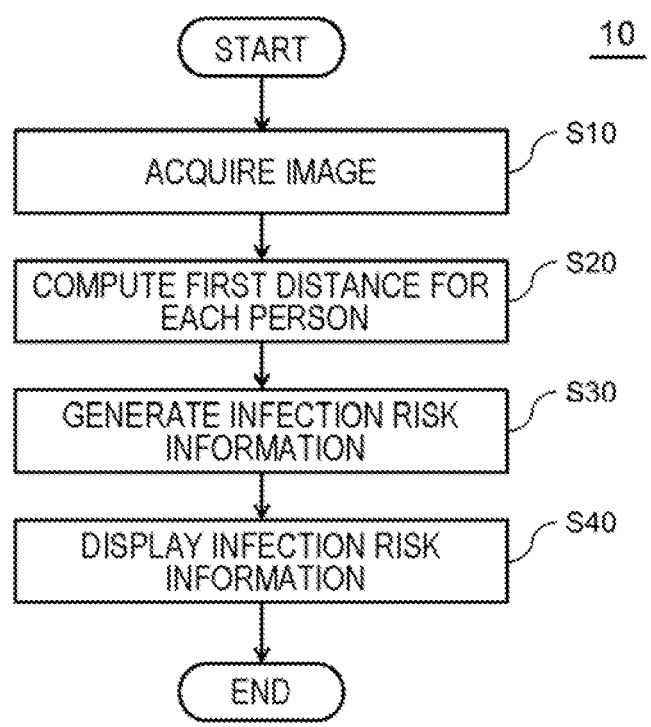
FIG. 5 is a flowchart illustrating a first example of processing performed by the image processing apparatus.

FIG. 5 is a flowchart illustrating a first example of processing performed by the image processing apparatus 10. First, the image processing unit 110 in the image processing apparatus 10 acquires an image to be processed (Step S10). Then, the image processing unit 110 processes the image and computes the aforementioned first distance for each person included in the image (Step S20). In the computation, the image processing unit 110 computes a first distance by using the height and the position of a person being a subject of computation of a distance in the image and the orientation of an image capture apparatus 20 generating the image in the vertical direction. At this time, as details will be described later, the image processing unit 110 uses a value preset as the height of a person (hereinafter described as a reference height).

Next, by using the first distance generated in Step S20, the risk information generation unit 120 generates infection risk information. An example of the method for generating infection risk information is as described by using FIG. 2 (Step S30).

Then, the display control unit 130 causes the display unit 140 to display the generated infection risk information. At this time, the display control unit 130 may cause the infection risk information to be displayed along with the image (may be the dynamic image) used to generate the infection risk information (Step S40). Examples of an image displayed here will be described later.

Figure 6:
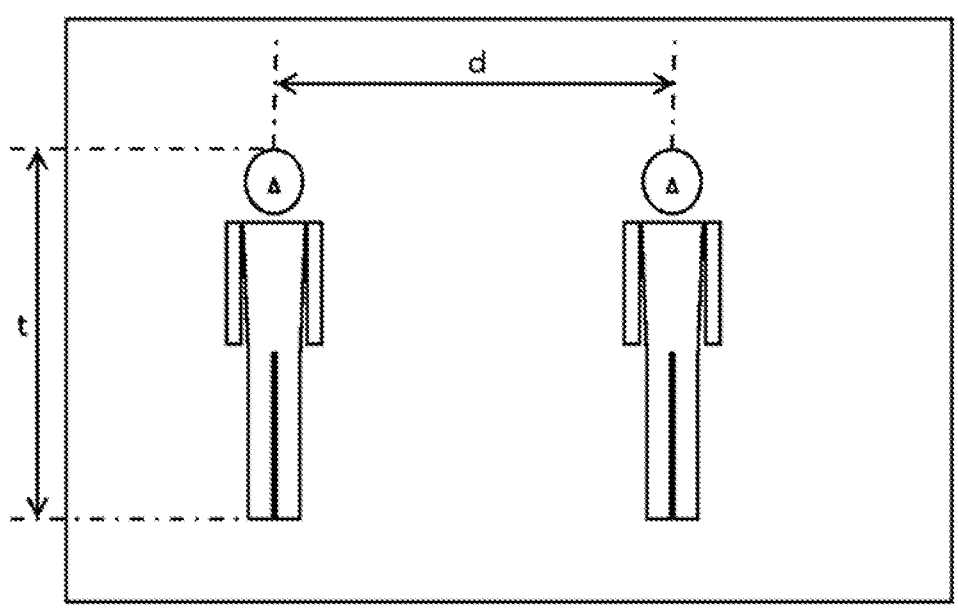
FIG. 6 is a diagram illustrating an example of a method for computing a first distance performed in Step S20 in FIG. 5.

FIG. 6 is a diagram illustrating an example of the method for computing a first distance performed in Step S20 in FIG. 5. The image processing unit 110 determines a reference person. Then, the image processing unit 110 performs processing illustrated in this diagram on each person positioned around the reference person.

First, the image processing unit 110 computes a height t of the reference person or a person positioned around the reference person in the image. For example, the height is represented by a pixel count. Next, the image processing unit 110 computes a distance d from the reference person to a person positioned around the reference person in the image. Note that d is represented in the same unit as t (such as a pixel count). Next, the image processing unit 110 computes d/t and, by multiplying the value by the aforementioned reference height, computes the distance between the reference person and the person positioned around the reference person.

When there is only one person around the reference person, the distance computed for the person is a first distance. Further, when there are a plurality of such persons, the aforementioned distance is computed for each of the plurality of persons, and the minimum value of the distances is a first distance.

Note that, as described above, the reference height is preset. The reference height may be changed according to a location where the image capture apparatus 20 is installed (such as a country). For example, an average height of adults in a country where an image capture apparatus 20 considered is installed is used as a reference height. As an example of specific processing, the storage unit 150 stores information for determining a reference height for each piece of image capture apparatus-identification information. Then, the image processing unit 110 acquires image capture apparatus-identification information of an image capture apparatus 20 generating an image to be processed, reads a reference height related to the image capture apparatus-identification information from the storage unit 150, and uses the reference height.

Further, when an attribute (such as at least one of a gender and an age group) of a person being a subject of computation of the height t can be estimated by image processing, the image processing unit 110 may change the reference height, based on the attribute.

Note that, in most images, distortion peculiar to an image capture apparatus 20 generating the image occurs. When computing a first distance, the image processing unit 110 preferably performs processing of correcting the distortion. The image processing unit 110 performs distortion correction processing based on the position of a person in an image. In general, distortion of an image is caused by, for example, an optical system (such as a lens) included in an image capture apparatus 20 and the orientation (such as the angle relative to the horizontal plane) of the image capture apparatus 20 in the vertical direction. Then, details of the distortion correction processing based on the position of the person in the image is set based on the optical system (such as a lens) included in the image capture apparatus 20 and the orientation of the image capture apparatus 20 in the vertical direction.

Note that, when an object the size of which is normalized to some extent is included in an image in the processing described by using this diagram, the image processing unit 110 may compute a first distance by using the size of the object in place of the height of a person.

Figure 7:
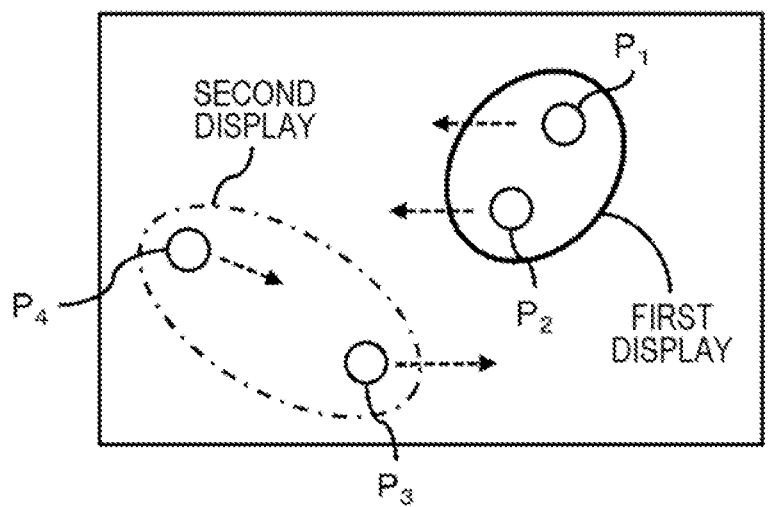
FIG. 7 is a diagram illustrating a first example of an image displayed on a display unit in Step S40 in FIG. 5.

FIG. 7 is a diagram illustrating a first example of an image displayed on the display unit 140 in Step S40 in FIG. 5. The display control unit 130 causes the display unit 140 to display infection risk information along with the image (may be the dynamic image) used to generate the infection risk information. In the example illustrated in FIG. 7, the display control unit 130 superimposes, on the image, a display for causing recognition of a combination of persons the first distance between whom has the reference value or less and then causes the display unit 140 to display the display and the image.

As an example, the display control unit 130 causes the display unit 140 to display a mark indicating a combination of persons recognized by the image processing unit 110. Then, the display control unit 130 changes the style of the mark, based on whether or not the first distance has the reference value or less. More specifically, in the example illustrated in this diagram, two persons constituting a combination of persons are enclosed by a circle or an ellipse. Then, the display color and/or the line style (such as a solid line, a dotted line, or a dot-and-dash line) of the circle or the ellipse is changed based on whether or not the first distance has the reference value or less.

Figure 8:
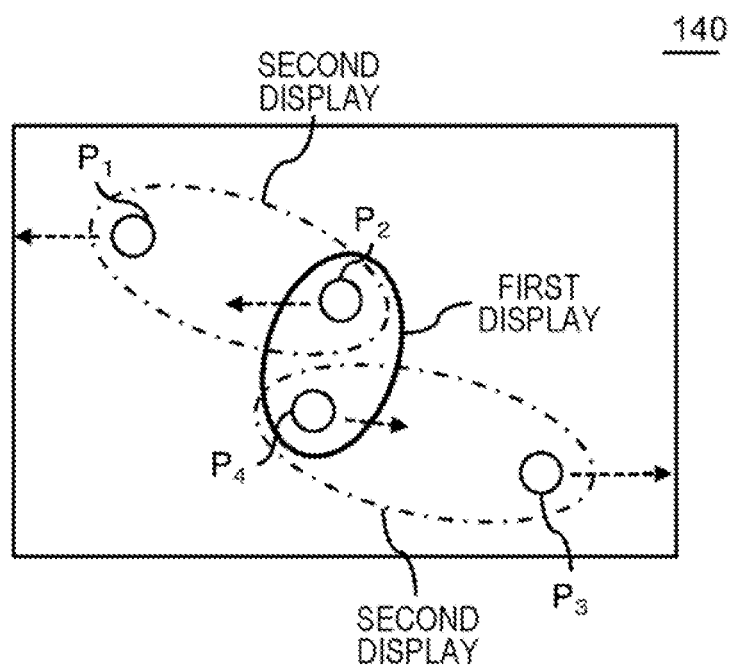
FIG. 8 is a diagram illustrating the first example of an image displayed on the display unit in Step S40 in FIG. 5.

Note that, when a displayed image is a dynamic image, a combination of persons being a subject of computation of a first distance changes as time elapses, as illustrated in FIG. 7 and FIG. 8. For example, a person $P_1$ is the counterpart to a person $P_2$ in computation of a first distance at a timing in FIG. 7, whereas a person $P_4$ is the counterpart in computation of a first distance at a later timing in FIG. 8.

Figure 17:
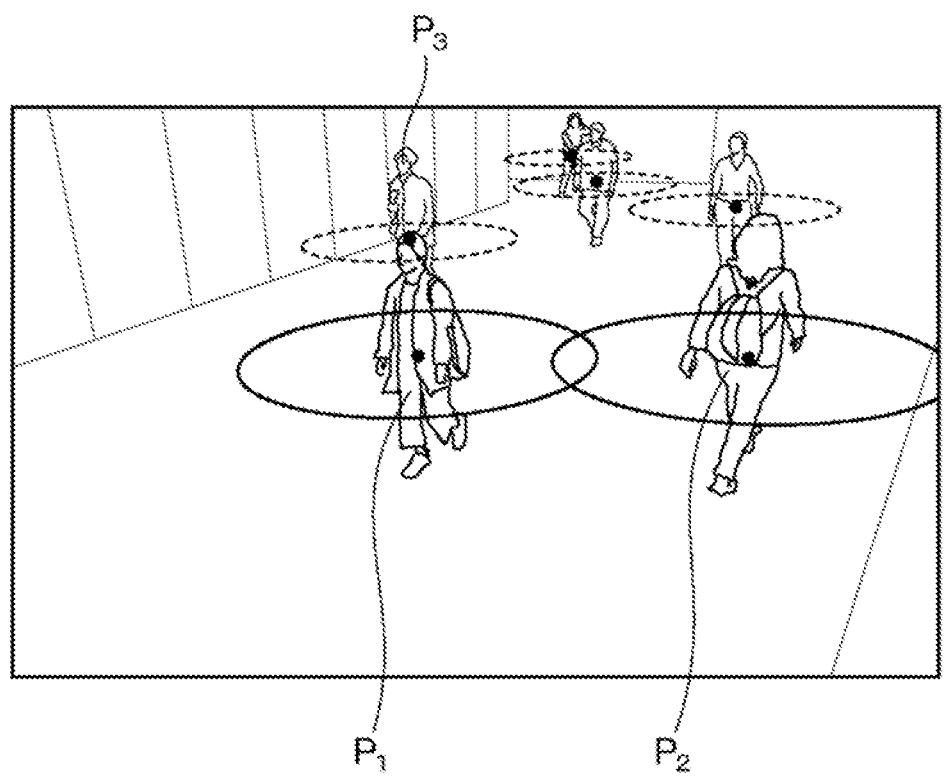
FIG. 17 is a diagram illustrating a second example of an image displayed on the display unit in Step S40 in FIG. 5.
Figure 18:
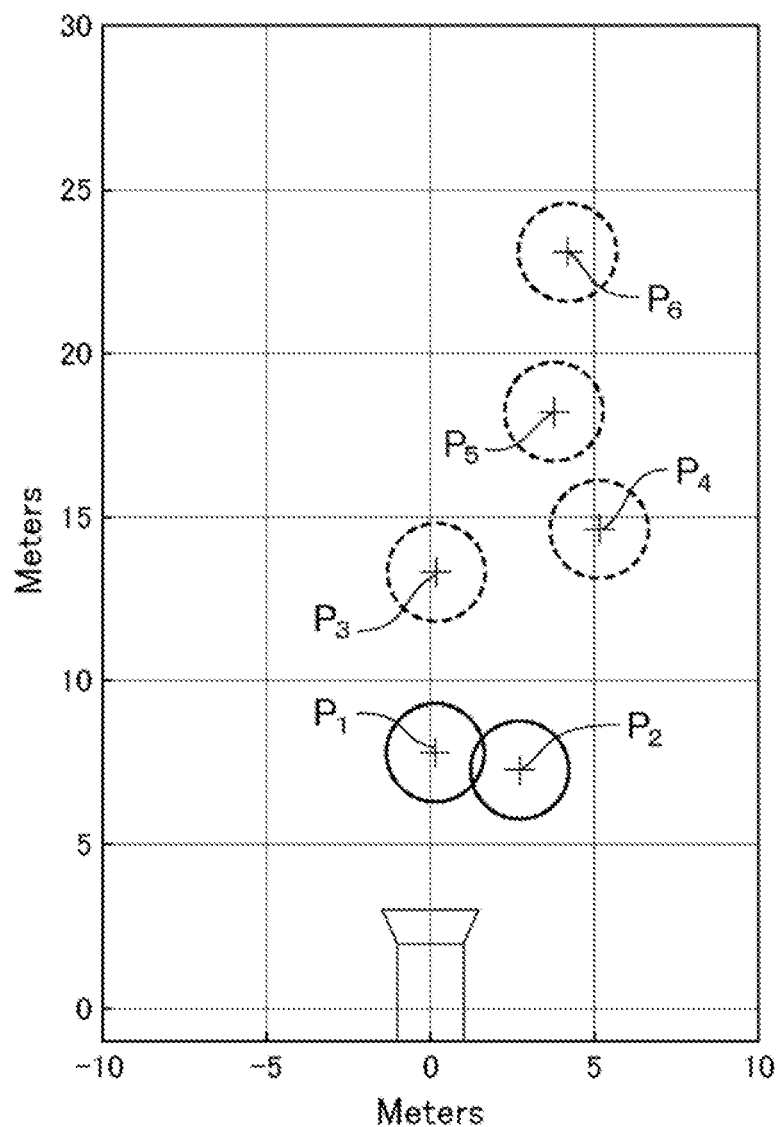
FIG. 18 is a diagram illustrating the second example of an image displayed on the display unit in Step S40 in FIG. 5.

FIG. 17 and FIG. 18 are diagrams illustrating a second example of an image displayed on the display unit 140 in Step S40 in FIG. 5. In these diagrams, for each person, the display control unit 130 causes a mark indicating a range of a recommended value (such as the aforementioned reference value) of a social distance around the person to be displayed. Then, when the mark related to a person overlaps the mark related to a nearby person, in other words, when the distance between a person and a nearby person has the recommended value of a social distance or less (for example, persons $P_1$ and $P_2$ in FIG. 17 and FIG. 18), the marks related to the two persons are displayed in a style different from a mark related to another person (such as a person $P_3$ in FIG. 17 and persons $P_3$, $P_4$, $P_5$, and $P_6$ in FIG. 18). Examples of the method for differentiation between styles include changing the display color and changing the line style (such as a solid line, a dotted line, or a dot-and-dash line) constituting the mark. For example, when changing the display color, the display control unit 130 causes the mark for a normal state to be displayed in blue and as for two marks overlapping each other, causes the two marks to be displayed in red.

In the example illustrated in FIG. 17, the display control unit 130 superimposes the aforementioned marks on an image (may be a dynamic image) used to generate infection risk information. On the other hand, in the example illustrated in FIG. 18, placement of persons is indicated in a plan view and then the aforementioned marks are superimposed on the plan view. The display control unit 130 may cause the display illustrated in FIG. 17 and the display illustrated in FIG. 18 to be displayed simultaneously on the display unit 140.

The displays illustrated in FIG. 7, FIG. 8, FIG. 17, and FIG. 18 may be displayed by using a real-time dynamic image or image. In this case, for example, the displays illustrated in the diagrams may be displayed on the display unit 140 installed near a target region or may be used as a content of the Internet or broadcasting.

Figure 9:
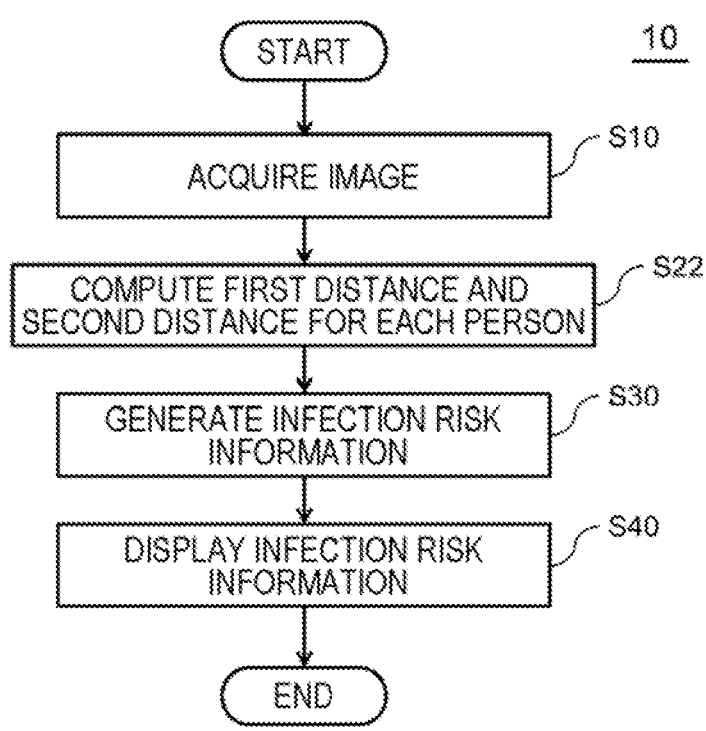
FIG. 9 is a flowchart illustrating a second example of the processing performed by the image processing apparatus.

FIG. 9 is a flowchart illustrating a second example of the processing performed by the image processing apparatus 10. The example illustrated in this diagram is similar to the example illustrated in FIG. 5 except that the image processing unit 110 also computes a second distance when computing a first distance (Step S22) and generates infection risk information by further using the second distance (Step S30).

The second distance is a distance from a reference person to the second closest person to the reference person. A method for computing a second distance is similar to the method for computing a first distance except for selecting a distance to the second closest person instead of the closest person. Then, the risk information generation unit 120 generates infection risk information in such a way that a risk increases (a safety factor decreases) as the second distance decreases. Note that the image processing unit 110 may further generate a distance from a reference person to the third closest person to the reference person (third distance). In this case, the risk information generation unit 120 generates infection risk information by further using the third distance.

Figure 10:
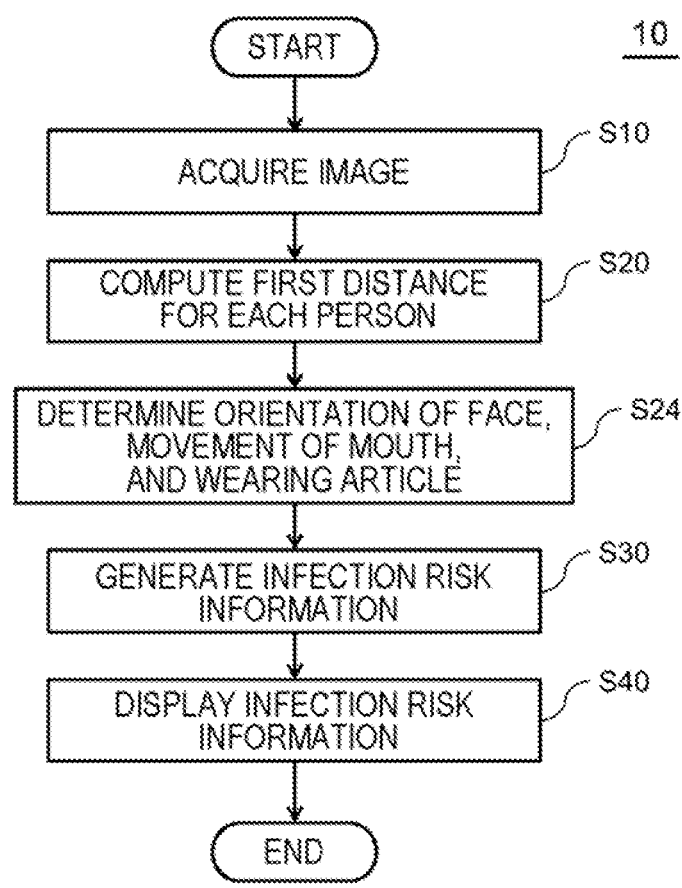
FIG. 10 is a flowchart illustrating a third example of the processing performed by the image processing apparatus.

FIG. 10 is a flowchart illustrating a third example of the processing performed by the image processing apparatus 10. The example illustrated in this diagram is similar to the example illustrated in FIG. 5 or FIG. 9 except for further using information other than a distance between persons when the risk information generation unit 120 generates infection risk information.

Specifically, Step S10 and Step S20 (or Step S22) are similar to the example illustrated in FIG. 5 (or FIG. 9). Then, by processing an image, the image processing unit 110 generates additional information required for generating infection risk information. The generated information is at least one of a determination result of the orientation of the face of a person, a determination result of existence of a wearing article on the face and the type thereof, and a determination result of movement of the mouth of the person (Step S24).

"The orientation of the face of a person" includes at least one of the orientation of the face of a reference person and the orientation of the face of the closest person to the reference person. Then, the risk information generation unit 120 increases a risk indicated by the infection risk information (decreases a safety factor) as the face of a person approaches toward such a direction as to face the counterpart. When using a second distance and a third distance, the image processing unit 110 and the risk information generation unit 120 may further use the orientation of the face of a person serving as a counterpart when the second distance is computed and the orientation of the face of a person serving as a counterpart when the third distance is computed.

"Existence of a wearing article on the face" includes at least one item out of existence of a wearing article on a reference person and existence of a wearing article on the closest person to the reference person. Then, when a specific type of wearing article is detected, the risk information generation unit 120 decreases a risk indicated by the infection risk information (increases the safety factor) relative to other cases. The specific type of wearing article refers to an article covering at least one of (preferably both of) the mouth and the nose, such as a face mask or a scarf. When using a second distance and a third distance, the image processing unit 110 and the risk information generation unit 120 may further perform similar processing on a person serving as a counterpart when the second distance is computed and a person serving as a counterpart when the third distance is computed.

"Movement of the mouth" means that at least the mouth is moving. When the mouth is moving, the person is highly likely to be speaking. Then, when the mouth of at least one of a reference person and the closest person to the reference person is moving, the risk information generation unit 120 increases a risk indicated by the infection risk information (decreases the safety factor) relative to other cases. When using a second distance and a third distance, the image processing unit 110 and the risk information generation unit 120 may further use movement of the mouth of a person serving as a counterpart when the second distance is computed and movement of the mouth of a person serving as a counterpart when the third distance is computed.

Figure 11:
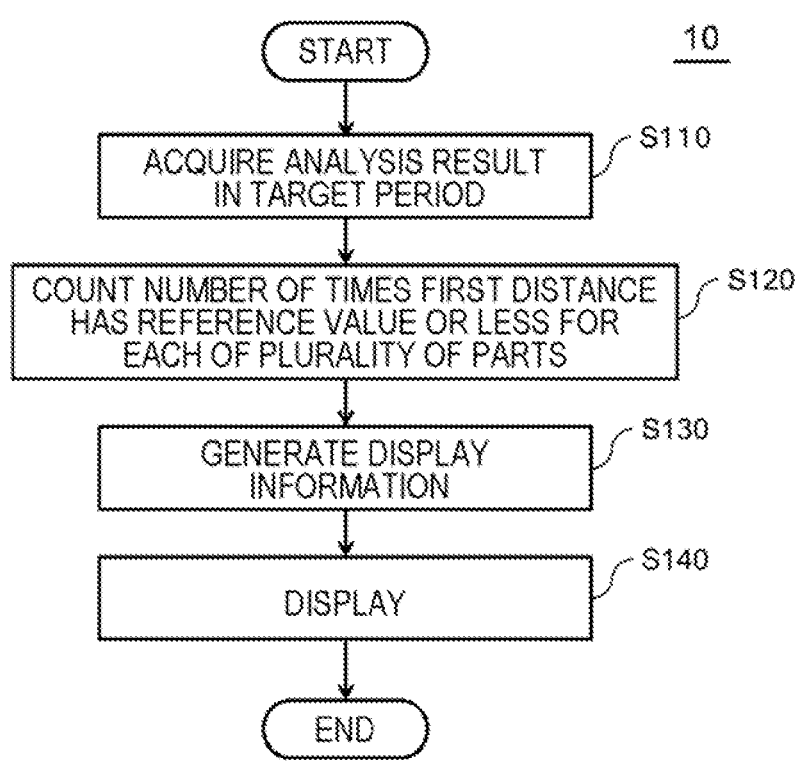
FIG. 11 is a flowchart illustrating a fourth example of the processing performed by the image processing apparatus.

FIG. 11 is a flowchart illustrating a fourth example of the processing performed by the image processing apparatus 10. The image processing apparatus 10 performs processing illustrated in this diagram in addition to the processing illustrated in FIG. 5, FIG. 9, or FIG. 10.

In the example illustrated in this diagram, the image capture apparatus 20 is a fixed camera. Therefore, each position in an image corresponds to a specific position in a target region. The image processing unit 110 previously stores the correspondence relation. Then, the image processing unit 110 identifies a location where a proximity indicator being an indicator related to a proximity state between a plurality of persons satisfies a criterion (hereinafter described as a caution-requiring location). Then, the risk information generation unit 120 (an example of an output unit) outputs information indicating the caution-requiring location.

More specifically, the image processing unit 110 in the image processing apparatus 10 identifies a position in the target region where the first distance has the reference value or less by identifying a position in the image where the first distance has the reference value or less in Step S20 in FIG. 5 and FIG. 10 or Step S22 in FIG. 9. Then, the image processing unit 110 causes the storage unit 150 to store information indicating the position in association with the processed image.

Then, the risk information generation unit 120 in the image processing apparatus 10 totals the number of times the first distance has a reference value or less in a target period (an example of the aforementioned proximity indicator) for each position in the target region by processing information stored in the storage unit 150. For example, the length of the target period may be one day, one week, or one month.

Specifically, first, the risk information generation unit 120 acquires information for determining an image capture apparatus 20 considered and information for determining the start and the end of a target period. For example, the acquisition is performed by input from a user. Next, the risk information generation unit 120 reads an analysis result of images generated by the image capture apparatus 20 considered in the target period from the storage unit 150. The read information includes information indicating the position where the first distance has the reference value or less. The information is generated for each image (Step S110).

Further, the target region is previously divided into a plurality of parts. Then, the risk information generation unit 120 counts the number of times the first distance has the reference value or less for each of the plurality of parts (Step S120). Note that the aforementioned "position where the first distance has the reference value or less" in the information stored in the storage unit 150 may be information indicating the part.

Then, the risk information generation unit 120 outputs information indicating a part where the count is a reference value or greater. The part indicated by the information is a part with a high infection risk, that is, a caution-requiring location. In the example illustrated in this diagram, the risk information generation unit 120 outputs information indicating the part. For example, the destination is the display control unit 130. In this case, the display control unit 130 generates display information for displaying information that indicates the part (Step S130) and causes the display unit 140 to display the display information (Step S140).

As illustrated by using FIG. 2, the image processing unit 110 can compute the duration of a state in which the first distance has the reference value or less by processing a plurality of temporally continuous images. In this case, the image processing unit 110 may perform the aforementioned processing by counting the number of times the state in which the first distance has the reference value or less continues for a reference time or longer.

Further, the output performed by the risk information generation unit 120 is used for identifying a location in a target region where persons tend to crowd together and improving such a location (for example, for improving a flow line of persons). As an example, when the target region is indoors, the output is used as reference data for changing placement and/or the number of objects (such as benches in a waiting room) placed in the indoors (such as a waiting room or a hallway). Note that examples of the flow line to be improved include a flow line from a waiting room to a consultation room in a hospital and a flow line from the entrance to a treatment room in a hospital.

While examples of the indoors include facilities such as a hospital, a public office, a station, and an airport, stores such as a large-scale store such as a shopping mall (including a case of being provided next to an airport or a station) may also be included. In the latter case, the output performed by the risk information generation unit 120 identifies a location where persons tend to crowd together in a building being a large-scale store. Then, the identification result is used as reference data when placement of tenants and a flow line are changed in order to prevent persons from crowding together in the location.

In the aforementioned example, a unit when setting a "caution-requiring location" is set by dividing one target region into a plurality of parts. On the other hand, a plurality of image capture apparatuses 20 may be connected to the image processing apparatus 10, and the plurality of image capture apparatuses 20 may capture images of locations different from each other in the same facility. In this case, a unit when setting a "caution-requiring location" may be an image capture region of one image capture apparatus 20 (that is, one target region). To do so, the image processing unit 110 may count the number of times the first distance has the reference value or less or the number of times the state continues for the reference time or longer for each image capture apparatus 20 instead of for each of the aforementioned plurality of parts.

Figure 12:
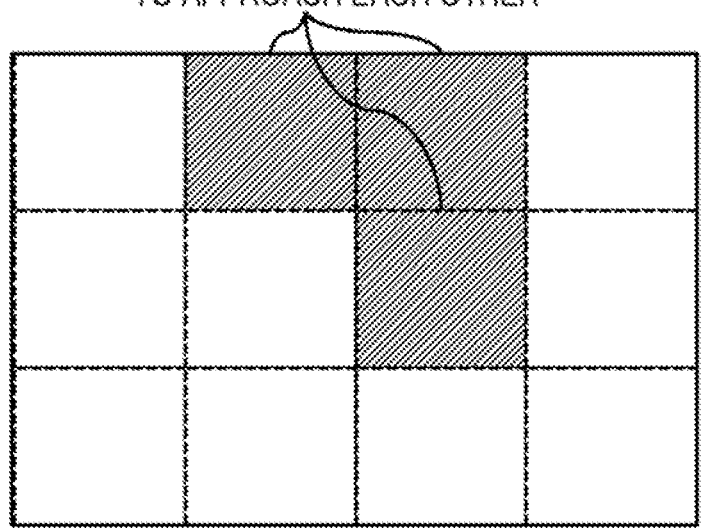
FIG. 12 illustrates an example of a screen displayed on the display unit in Step S140 in FIG. 11.

FIG. 12 illustrates an example of a screen displayed on the display unit 140 in Step S140 in FIG. 11. In the example illustrated in this diagram, the display unit 140 displays a plan view of a target region. Then, the display control unit 130 causes the display unit 140 to display a part in the plan view where the count in Step S120 is the reference value or greater in such a way that the part is distinguishable from another part.

Note that a plurality of values in stages may be set as reference values related to a count. In this case, the risk information generation unit 120 determines which reference value is exceeded by the count in Step S120 and outputs information indicating the value on which the determination is made. For example, the display control unit 130 may change the display style of the corresponding part, based on the output. For example, a part where only the lowest reference value is exceeded may be indicated in green, and a part where the highest reference value is exceeded may be indicated in red.

Figure 13:
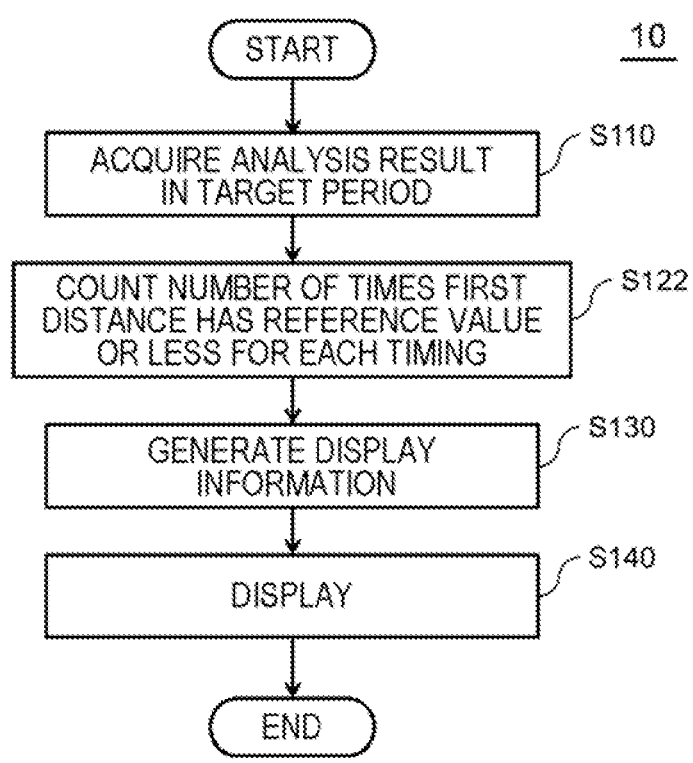
FIG. 13 is a flowchart illustrating a fifth example of the processing performed by the image processing apparatus.

FIG. 13 is a flowchart illustrating a fifth example of the processing performed by the image processing apparatus 10. The image processing apparatus 10 performs processing illustrated in this diagram in addition to the processing illustrated in FIG. 5, FIG. 9, or FIG. 10. The image processing apparatus 10 may further perform the processing illustrated in FIG. 11.

In this diagram, the risk information generation unit 120 in the image processing apparatus 10 identifies a timing when a risk of contracting an infectious disease increases (a timing when a safety factor decreases). For example, the timing is set for each day of the week, each time period, or each day of the week and each time period.

In the example illustrated in this diagram, processing described in Step S110 is similar to the processing described by using FIG. 11.

Next, for each timing, the risk information generation unit 120 counts the number of times the first distance has the reference value or less (Step S122). The risk information generation unit 120 may further perform per-timing counting for each of a plurality of parts in the target region as illustrated in FIG. 11.

Next, the risk information generation unit 120 outputs information indicating a timing when the count is the reference value or greater. The timing indicated by the information (such as a time period or a day of the week) is a timing with a high infection risk. As an example, the risk information generation unit 120 outputs the information indicating the timing to the display control unit 130. Then, the display control unit 130 generates display information for displaying the information indicating the timing (Step S130) and causes the display unit 140 to display the display information (Step S140).

Note that, when the target region is inside a store, the display unit 140 may be provided at the entrance of the store or in a show window. Thus, a person who intends to enter the store can recognize a timing when the store is less crowded. Further, the display control unit 130 may publish the display information generated in Step S130 on the Internet. Thus, a person planning to visit the store can recognize a timing when the store is considered less crowded.

Further, when the target region is inside a store and the display unit 140 is provided at the entrance of the store or in a show window, the display control unit 130 may cause the display unit 140 to display current infection risk information or may cause the display unit 140 to perform the displays illustrated in FIG. 7, FIG. 8, FIG. 17, and FIG. 18 by using a real-time dynamic image or image.

Figure 14:
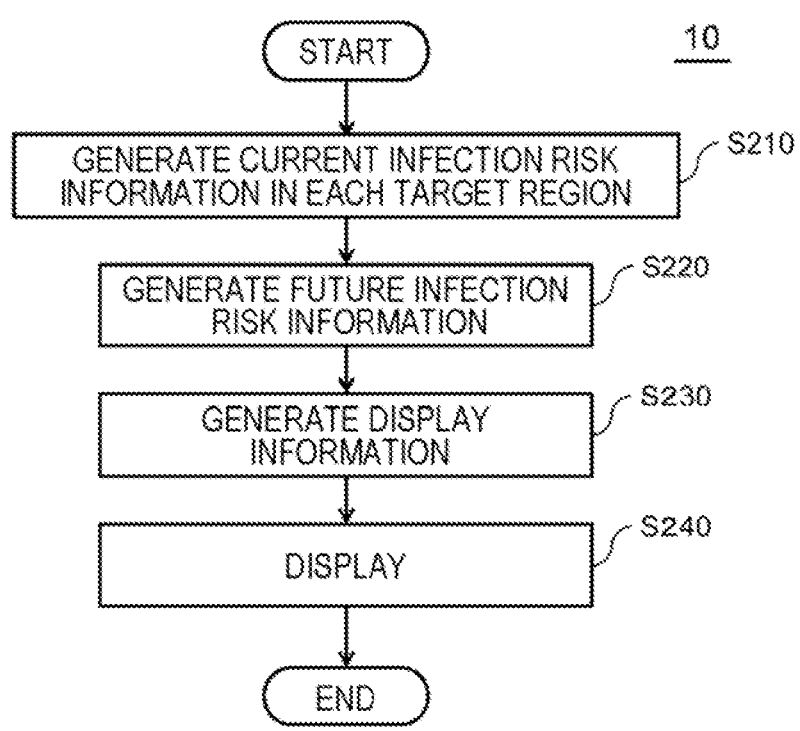
FIG. 14 is a flowchart illustrating a sixth example of the processing performed by the image processing apparatus.

FIG. 14 is a flowchart illustrating a sixth example of the processing performed by the image processing apparatus 10. The image processing apparatus 10 performs processing illustrated in this diagram in addition to the processing illustrated in FIG. 5, FIG. 9, or FIG. 10. The image processing apparatus 10 may further perform at least one type of processing out of the processing illustrated in FIG. 11 and the processing illustrated in FIG. 13.

In the example illustrated in this diagram, the risk information generation unit 120 causes the storage unit 150 to store at least one of a history of past infection risk information and a result of statistical processing of the history for each of a plurality of image capture apparatuses 20, in other words, for each of a plurality of target regions. Note that the plurality of target regions are related to each other in a flow of persons. As an example, the plurality of target regions may adjoin each other or may exist along the same road or railroad (subway).

Then, when the storage unit 150 stores only a history of past infection risk information, the risk information generation unit 120 statistically processes the history. Then, the risk information generation unit 120 generates an estimation result of infection risk information at a predetermined future timing by using the result of statistical processing of the history of infection risk information, and the current infection risk information. For example, while the predetermined timing may be after one hour, after three hours, or after five hours, the timing is preferably within 24 hours. For example, the result of statistical processing of the history is a model generated by machine learning but is not limited thereto. Note that the model outputs an estimation result of infection risk information at a predetermined future timing when the current infection risk information is input.

First, by processing a current image generated by each of a plurality of image capture apparatuses 20 installed in target regions different from each other, the risk information generation unit 120 generates current infection risk information relating to each of the plurality of target regions (Step S210). At this time, the risk information generation unit 120 may further process images generated between the present time and a predetermined time ago.

Next, the risk information generation unit 120 acquires a result of statistical processing of the history of infection risk information relating to each of the plurality of target regions. The acquisition may be performed by readout from the storage unit 150 or may be performed by on-the-fly statistical processing of the history of infection risk information.

Next, the risk information generation unit 120 generates an estimation result of infection risk information at the predetermined future timing by using the result of statistical processing of the history of infection risk information, and the current infection risk information (Step S220).

Next, the display control unit 130 generates display information for displaying the current infection risk information and the estimation result of infection risk information at the predetermined future timing, the pieces of information being generated by the risk information generation unit 120 (Step S230). By using the display information, the display unit 140 displays the current infection risk information and the estimation result of infection risk information at the predetermined future timing (Step S240). A person viewing the display can set a timing for taking an action (such as a timing for riding a train or a timing for going to a destination) to a timing with a lower infection risk.

Note that, when generating an estimation result of infection risk information at the predetermined future timing, the risk information generation unit 120 may determine an increasing or decreasing trend of the current infection risk information and use the determination result instead of performing statistical processing. For example, the risk information generation unit 120 determines the increasing or decreasing trend by using changes in the number of times the first distance has the reference value or less from the past to the present.

Figure 15:
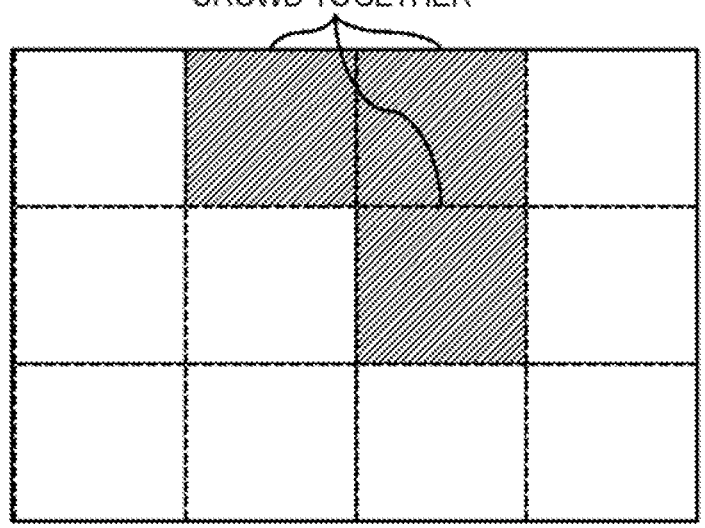
FIG. 15 is a diagram illustrating current infection risk information displayed on the display unit.

FIG. 15 illustrates current infection risk information displayed on the display unit 140. As described above, the risk information generation unit 120 generates infection risk information for each of a plurality of target regions. In the example illustrated in this diagram, the plurality of target regions represent a plurality of regions acquired by dividing one large area. Then, the display control unit 130 causes the display unit 140 to display a target region where a risk indicated by infection risk information has a reference value or greater in a manner distinguishable from another target region. Note that the display control unit 130 may cause changes in infection risk information from the past to the present to be displayed in the processing.

Figure 16:
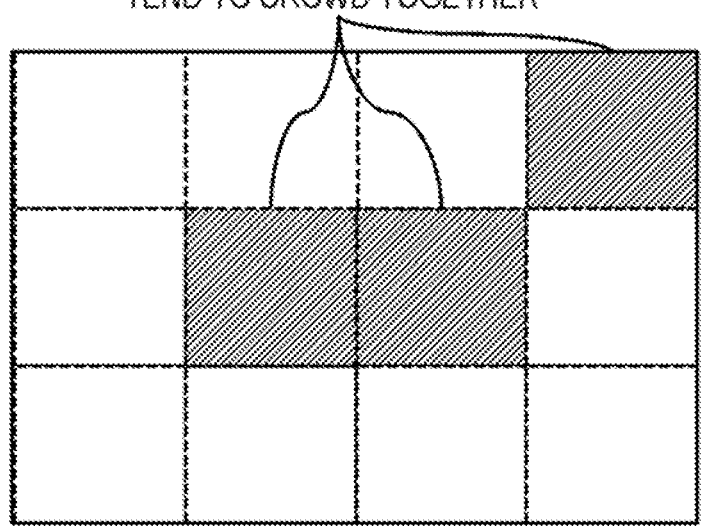
FIG. 16 is a diagram illustrating future infection risk information displayed on the display unit.

FIG. 16 illustrates future infection risk information displayed on the display unit 140. In the example illustrated in this diagram, the display control unit 130 causes the display unit 140 to display a target region where a risk indicated by future infection risk information has the reference value or greater in a manner distinguishable from another target region. When a plurality of target regions are related to each other in a flow of persons, generation of future infection risk information relating to a certain target region may be performed by using current infection risk information relating to the periphery of the target region. The reason is that a person in a certain target region may move to another target region after several hours.

Note that the displays illustrated in FIG. 15 and FIG. 16 may be published on the Internet or may be included in a television broadcast content.

As described above, according to the present example embodiment, for a person being at least part of a plurality of persons, the image processing unit 110 in the image processing apparatus 10 computes the distance to the closest person to the person (first distance) by acquiring and processing an image generated by the image capture apparatus 20, that is, an image including the plurality of persons. Then, the risk information generation unit 120 generates infection risk information relating to a target region being an image capture target of the image capture apparatus 20 by using the first distance. Therefore, the risk of contracting an infectious disease in the target region can be readily recognized.

Further, the risk information generation unit 120 outputs a location where a proximity indicator being an indicator related to a proximity state between a plurality of persons satisfies a criterion. For example, the output is displayed on the display unit 140. Thus, recognition of a location with a high possibility of contracting an infectious disease is facilitated.

While the example embodiments of the present invention have been described above with reference to the drawings, the example embodiments are exemplifications of the present invention, and various configurations other than those described above may be employed.

Further, while a plurality of processes (processing) are described in a sequential order in each of a plurality of flowcharts used in the aforementioned description, the execution order of processes executed in each example embodiment is not limited to the order of description. The order of the illustrated processes may be modified without affecting the contents in each example embodiment. Further, the aforementioned example embodiments may be combined without contradicting one another.

The whole or part of the example embodiments disclosed above may also be described as, but not limited to, the following supplementary notes.

1. An image processing apparatus including:
   an image processing unit that, by processing an image including a plurality of persons, computes, for a person being at least part of the plurality of persons, a first distance being a distance to the closest person to the person; and
   a risk information generation unit that, by using the first distance, generates infection risk information being information about a risk of contracting an infectious disease or a safety factor of not contracting an infectious disease in a target region being a region included in the image.

2. The image processing apparatus according to aforementioned 1, in which
   the image processing unit further computes a second distance being a distance to a second closest person to the person, and
   the risk information generation unit generates the infection risk information by further using the second distance.

3. The image processing apparatus according to aforementioned 1 or 2, in which
   the image processing unit further determines at least one of an orientation of a face of the person and an orientation of a face of the closest person, and
   the risk information generation unit generates the infection risk information by further using a determination result of an orientation of the face.

4. The image processing apparatus according to any one of aforementioned 1 to 3, in which
   the image processing unit further determines at least one of a wearing article on a face of the person and a wearing article on a face of the closest person, and
   the risk information generation unit generates the infection risk information by further using a determination result of the wearing article.

5. The image processing apparatus according to any one of aforementioned 1 to 4, in which
   the image processing unit further determines movement of a mouth of one of the person and the closest person, and the risk information generation unit generates the infection risk information by further using a determination result of movement of the mouth.

6. The image processing apparatus according to any one of aforementioned 1 to 5, in which
the image processing unit computes the first distance by using a height and a position of the person in the image.

7. The image processing apparatus according to aforementioned 6, in which
the image processing unit
further computes the first distance by using a reference height being a preset value and
sets the reference height by using a location where the image is generated.

8. The image processing apparatus according to any one of aforementioned 1 to 7, in which
the risk information generation unit determines whether the first distance has a reference value or less and generates the infection risk information by using the determination result.

9. The image processing apparatus according to aforementioned 8, further including
a first display control unit that superimposes, on the image, a display for causing recognition of a combination of the person and the closest person the first distance between whom has a reference value or less and then causes a display unit to display the display and the image.

10. The image processing apparatus according to aforementioned 8 or 9, in which
the image processing unit processes a plurality of the images in which the target region is captured at a plurality of timings, and
the risk information generation unit
counts, for each of a plurality of parts included in the target region, a number of times the first distance has a reference value or less in the part and
outputs information indicating the part where the counting result satisfies a criterion.

11. The image processing apparatus according to any one of aforementioned 1 to 10, in which
the image processing unit processes a plurality of the images in which the target region is captured at a plurality of timings, and
the risk information generation unit generates the infection risk information at each of the plurality of timings and determines a timing when the risk increases or a timing when the safety factor decreases by using the plurality of pieces of the infection risk information.

12. The image processing apparatus according to any one of aforementioned 1 to 11, in which
the risk information generation unit generates an estimation result of the infection risk information at a predetermined future timing by using a result of statistical processing of a history of the past infection risk information, and the current infection risk information.

13. The image processing apparatus according to any one of aforementioned 1 to 12, in which
the image processing unit generates the first distance for each of a plurality of target regions by processing an image generated for each of the plurality of the target regions,
the risk information generation unit generates the infection risk information for each of the plurality of target regions, and
the image processing apparatus further includes a second display control unit that causes a display unit to display a target region where a risk indicated by the infection risk information has a reference value or greater in a manner distinguishable from the another target region.

14. An image processing method including, by a computer:
performing image processing of, by processing an image including a plurality of persons, computing, for a person being at least part of the plurality of persons, a first distance being a distance to the closest person to the person; and
performing risk information generation processing of, by using the first distance, generating infection risk information being information about a risk of contracting an infectious disease or a safety factor of not contracting an infectious disease in a target region being a region included in the image.

15. The image processing method according to aforementioned 14, in which,
in the image processing, the computer further computes a second distance being a distance to a second closest person to the person, and,
in the risk information generation processing, the computer generates the infection risk information by further using the second distance.

16. The image processing method according to aforementioned 14 or 15, in which,
in the image processing, the computer further determines at least one of an orientation of a face of the person and an orientation of a face of the closest person, and,
in the risk information generation processing, the computer generates the infection risk information by further using a determination result of an orientation of the face.

17. The image processing method according to any one of aforementioned 14 to 16, in which,
in the image processing, the computer further determines at least one of a wearing article on a face of the person and a wearing article on a face of the closest person, and,
in the risk information generation processing, the computer generates the infection risk information by further using a determination result of the wearing article.

18. The image processing method according to any one of aforementioned 14 to 17, in which,
in the image processing, the computer further determines movement of a mouth of one of the person and the closest person, and,
in the risk information generation processing, the computer generates the infection risk information by further using a determination result of movement of the mouth.

19. The image processing method according to any one of aforementioned 14 to 18, in which,
in the image processing, the computer computes the first distance by using a height and a position of the person in the image.

20. The image processing method according to aforementioned 19, in which,
in the image processing, the computer
further computes the first distance by using a reference height being a preset value and
sets the reference height by using a location where the image is generated.

21. The image processing method according to any one of aforementioned 14 to 20, in which,
in the risk information generation processing, the computer determines whether the first distance has a reference value or less and generates the infection risk information by using the determination result.

22. The image processing method according to aforementioned 21, further including, by the computer,
 performing first display control of superimposing, on the image, a display for causing recognition of a combination of the person and the closest person the first distance between whom has a reference value or less and then causing a display unit to display the display and the image.

23. The image processing method according to aforementioned 21 or 22, in which,
 in the image processing, the computer processes a plurality of the images in which the target region is captured at a plurality of timings, and,
 in the risk information generation processing, the computer
  counts, for each of a plurality of parts included in the target region, a number of times the first distance has a reference value or less in the part and
  outputs information indicating the part where the counting result satisfies a criterion.

24. The image processing method according to any one of aforementioned 14 to 23, in which,
 in the image processing, the computer processes a plurality of the images in which the target region is captured at a plurality of timings, and,
 in the risk information generation processing, the computer generates the infection risk information at each of the plurality of timings and determines a timing when the risk increases or a timing when the safety factor decreases by using the plurality of pieces of the infection risk information.

25. The image processing method according to any one of aforementioned 14 to 24, in which,
 in the risk information generation processing, the computer generates an estimation result of the infection risk information at a predetermined future timing by using a result of statistical processing of a history of the past infection risk information, and the current infection risk information.

26. The image processing method according to any one of aforementioned 14 to 25, in which,
 in the image processing, the computer generates the first distance for each of a plurality of target regions by processing an image generated for each of the plurality of the target regions,
 in the risk information generation processing, the computer generates the infection risk information for each of the plurality of target regions, and
 the image processing method further includes, by the computer, performing second display control of causing a display unit to display a target region where a risk indicated by the infection risk information has a reference value or greater in a manner distinguishable from the another target region.

27. A program causing a computer to perform:
 an image function of, by processing an image including a plurality of persons, computing, for a person being at least part of the plurality of persons, a first distance being a distance to the closest person to the person; and
 a risk information generation function of, by using the first distance, generating infection risk information being information about a risk of contracting an infectious disease or a safety factor of not contracting an infectious disease in a target region being a region included in the image.

28. The program according to aforementioned 27, in which
 the image processing function further computes a second distance being a distance to a second closest person to the person, and
 the risk information generation function generates the infection risk information by further using the second distance.

29. The program according to aforementioned 27 or 28, in which
 the image processing function further determines at least one of an orientation of a face of the person and an orientation of a face of the closest person, and
 the risk information generation function generates the infection risk information by further using a determination result of an orientation of the face.

30. The program according to any one of aforementioned 27 to 29, in which
 the image processing function further determines at least one of a wearing article on a face of the person and a wearing article on a face of the closest person, and
 the risk information generation function generates the infection risk information by further using a determination result of the wearing article.

31. The program according to any one of aforementioned 27 to 30, in which
 the image processing function further determines movement of a mouth of one of the person and the closest person, and
 the risk information generation function generates the infection risk information by further using a determination result of movement of the mouth.

32. The program according to any one of aforementioned 27 to 31, in which
 the image processing function computes the first distance by using a height and a position of the person in the image.

33. The program according to aforementioned 32, in which
 the image processing function
  further computes the first distance by using a reference height being a preset value and
  sets the reference height by using a location where the image is generated.

34. The program according to any one of aforementioned 27 to 33, in which
 the risk information generation function determines whether the first distance has a reference value or less and generates the infection risk information by using the determination result.

35. The program according to aforementioned 34, further causing the computer to perform
 a first display control function of superimposing, on the image, a display for causing recognition of a combination of the person and the closest person the first distance between whom has a reference value or less and then causing a display unit to display the display and the image.

36. The program according to aforementioned 34 or 35, in which
 the image processing function processes a plurality of the images in which the target region is captured at a plurality of timings, and
 the risk information generation function
  counts, for each of a plurality of parts included in the target region, a number of times the first distance has a reference value or less in the part and
  outputs information indicating the part where the counting result satisfies a criterion.

37. The program according to any one of aforementioned 27 to 36, in which
the image processing function processes a plurality of the images in which the target region is captured at a plurality of timings, and
the risk information generation function generates the infection risk information at each of the plurality of timings and determines a timing when the risk increases or a timing when the safety factor decreases by using the plurality of pieces of the infection risk information.

38. The program according to any one of aforementioned 27 to 37, in which
the risk information generation function generates an estimation result of the infection risk information at a predetermined future timing by using a result of statistical processing of a history of the past infection risk information, and the current infection risk information.

39. The program according to any one of aforementioned 27 to 38, in which
the image processing function generates the first distance for each of a plurality of target regions by processing an image generated for each of the plurality of the target regions,
the risk information generation function generates the infection risk information for each of the plurality of target regions, and
the program further causes the computer to perform a second display control function of causing a display unit to display a target region where a risk indicated by the infection risk information has a reference value or greater in a manner distinguishable from the another target region.

This application is based upon and claims the benefit of priority from Japanese Patent Application No. 2020-098401, filed on Jun. 5, 2020, the disclosure of which is incorporated herein in its entirety by reference.

REFERENCE SIGNS LIST

10 Image processing apparatus
20 Image capture apparatus
110 Image processing unit
120 Risk information generation unit
130 Display control unit
140 Display unit
150 Storage unit

What is claimed is:

1. An image processing apparatus comprising:
at least one memory storing instructions; and
at least one processor configured to execute the instructions to perform operations comprising:
by processing an image including a plurality of persons, computing, for a person being at least part of the plurality of persons, a first distance being a distance to the closest person to the person;
by using the first distance, generating infection risk information being information about a risk of contracting an infectious disease or a safety factor of not contracting an infectious disease in a target region being a region included in the image;
determining at least one of an orientation of a face of the person and an orientation of a face of the closest person; and
generating the infection risk information by further using a determination result of an orientation of the face,
wherein generating the infection risk information comprises outputting the image as including a mark superimposed over a display of the person, and wherein, in generating the image, any of a color and a line style of the mark depends on the infection risk information.

2. The image processing apparatus according to claim 1, wherein the operations comprise:
further computing a second distance being a distance to a second closest person to the person; and
generating the infection risk information by further using the second distance.

3. The image processing apparatus according to claim 1, wherein the operations comprise:
determining at least one of a wearing article on a face of the person and a wearing article on a face of the closest person; and
generating the infection risk information by further using a determination result of the wearing article.

4. The image processing apparatus according to claim 1, wherein the operations comprise:
determining movement of a mouth of one of the person and the closest person, and
generating the infection risk information by further using a determination result of movement of the mouth.

5. The image processing apparatus according to claim 1, wherein
the operations comprise computing the first distance by using a height and a position of the person in the image.

6. The image processing apparatus according to claim 5, wherein the operations comprise:
computing the first distance by using a reference height being a preset value; and
setting the reference height by using a location where the image is generated.

7. The image processing apparatus according to claim 1, wherein
the operations comprise determining whether the first distance has a reference value or less and generates the infection risk information by using the determination result.

8. The image processing apparatus according to claim 7, the operations further comprise:
superimposing, on the image, a display information for causing recognition of a combination of the person and the closest person the first distance between whom has a reference value or less; and
causing a display—to display the display information and the image.

9. The image processing apparatus according to claim 7, wherein the operations comprise:
processing a plurality of the images in which the target region is captured at a plurality of timings;
counting, for each of a plurality of parts included in the target region, a number of times the first distance has a reference value or less in the part; and
outputting information indicating the part where the counting result satisfies a criterion.

10. The image processing apparatus according to claim 1, wherein the operations comprise:
processing a plurality of the images in which the target region is captured at a plurality of timings; and
generating the infection risk information at each of the plurality of timings; and
determining a timing when the risk increases or a timing when the safety factor decreases by using the plurality of pieces of the infection risk information.

11. The image processing apparatus according to claim 1, wherein
the operations comprise generating an estimation result of the infection risk information at a predetermined future timing by using a result of statistical processing of a history of the past infection risk information, and the current infection risk information.

12. The image processing apparatus according to claim 1, wherein the operations comprise:
generating the first distance for each of a plurality of target regions by processing an image generated for each of the plurality of the target regions;
generating the infection risk information for each of the plurality of target regions; and
causing a display to display a target region where a risk indicated by the infection risk information has a reference value or greater in a manner distinguishable from the another target region.

13. An image processing method comprising, by a computer:
performing image processing of, by processing an image including a plurality of persons, computing, for a person being at least part of the plurality of persons, a first distance being a distance to the closest person to the person;
performing risk information generation processing of, by using the first distance, generating infection risk information being information about a risk of contracting an infectious disease or a safety factor of not contracting an infectious disease in a target region being a region included in the image;
determining at least one of an orientation of a face of the person and an orientation of a face of the closest person; and
generating the infection risk information by further using a determination result of an orientation of the face,
wherein generating the infection risk information comprises outputting the image as including a mark superimposed over a display of the person, and wherein, in generating the image, any of a color and a line style of the mark depends on the infection risk information.

14. A non-transitory computer-readable medium storing a program causing a computer to perform operations comprising:
by processing an image including a plurality of persons, computing, for a person being at least part of the plurality of persons, a first distance being a distance to the closest person to the person;
by using the first distance, generating infection risk information being information about a risk of contracting an infectious disease or a safety factor of not contracting an infectious disease in a target region being a region included in the image;
determining at least one of an orientation of a face of the person and an orientation of a face of the closest person; and
generating the infection risk information by further using a determination result of an orientation of the face,
wherein generating the infection risk information comprises outputting the image as including a mark superimposed over a display of the person, and wherein, in generating the image, any of a color and a line style of the mark depends on the infection risk information.

15. An image processing apparatus comprising:
at least one memory storing instructions; and
at least one processor configured to execute the instructions to perform operations comprising:
by processing an image including a plurality of persons, computing, for a person being at least part of the plurality of persons, a first distance being a distance to the closest person to the person;
by using the first distance, generating infection risk information being information about a risk of contracting an infectious disease or a safety factor of not contracting an infectious disease in a target region being a region included in the image;
determining at least one of a wearing article on a face of the person and a wearing article on a face of the closest person; and
generating the infection risk information by further using a determination result of the wearing article,
wherein generating the infection risk information comprises outputting the image as including a mark superimposed over a display of the person, and wherein, in generating the image, any of a color and a line style of the mark depends on the infection risk information.

16. An image processing method comprising, by a computer:
performing image processing of, by processing an image including a plurality of persons, computing, for a person being at least part of the plurality of persons, a first distance being a distance to the closest person to the person;
performing risk information generation processing of, by using the first distance, generating infection risk information being information about a risk of contracting an infectious disease or a safety factor of not contracting an infectious disease in a target region being a region included in the image;
determining at least one of a wearing article on a face of the person and a wearing article on a face of the closest person; and
generating the infection risk information by further using a determination result of the wearing article,
wherein generating the infection risk information comprises outputting the image as including a mark superimposed over a display of the person, and wherein, in generating the image, any of a color and a line style of the mark depends on the infection risk information.

17. A non-transitory computer-readable medium storing a program causing a computer to perform operations comprising:
by processing an image including a plurality of persons, computing, for a person being at least part of the plurality of persons, a first distance being a distance to the closest person to the person;
by using the first distance, generating infection risk information being information about a risk of contracting an infectious disease or a safety factor of not contracting an infectious disease in a target region being a region included in the image;
determining at least one of a wearing article on a face of the person and a wearing article on a face of the closest person; and
generating the infection risk information by further using a determination result of the wearing article,
wherein generating the infection risk information comprises outputting the image as including a mark superimposed over a display of the person, and wherein, in generating the image, any of a color and a line style of the mark depends on the infection risk information.

* * * * *